July 22, 1930. J. J. BEDNAR 1,771,071
GREASE CUP
Filed Sept. 29, 1928
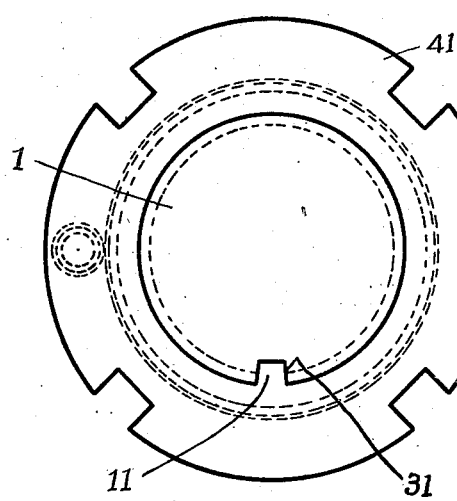
Fig. I.
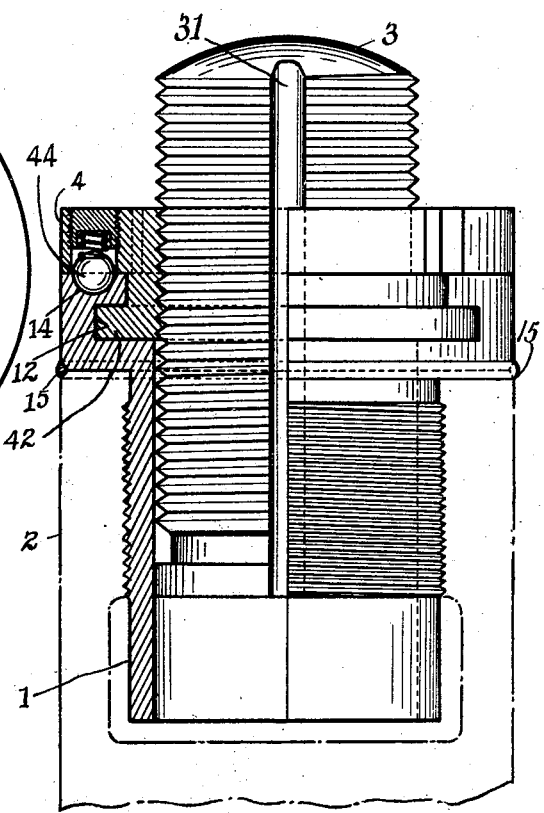
Fig. II.
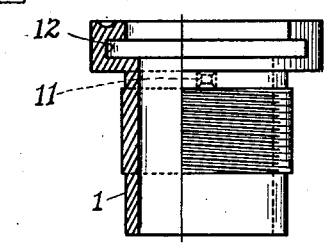
Fig. III.
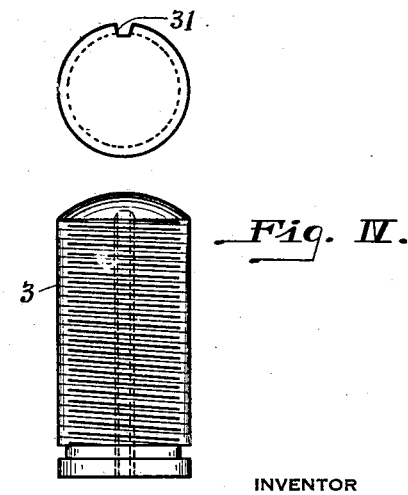
Fig. IV.
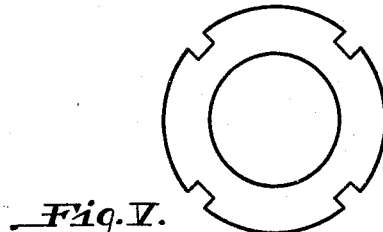
Fig. V.
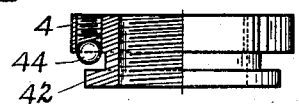
INVENTOR
Joseph J. Bednar
by Christy and Christy
his attorneys Patented July 22, 1930

1,771,071

UNITED STATES PATENT OFFICE

JOSEPH J. BEDNAR, OF McKEES ROCKS, PENNSYLVANIA

GREASE CUP

Application filed September 29, 1928. Serial No. 309,178.

My invention relates to improvements in grease cups. I have developed a grease cup adapted to be applied to the driving connections of a locomotive engine, and in such development I shall show and describe it. The objects are to provide a grease cup in the use of which a quantity of grease may, under the control of the engineer, be gradually supplied to the parts requiring lubrication, so that the supply is adequate and at the same time is controlled, to prevent loss and waste. A further object is such an assembly of parts as may easily be brought together and separated, and yet an assembly which is secure under such conditions of service as a travelling locomotive, for example, affords. The parts will not be shaken apart, and parts will not be lost.

In the accompanying drawings Fig. I is a view in plan from above of the assembled grease cup of my invention; Fig. II is a view partly in vertical and medial section, partly in side elevation of the grease cup in exemplary installation. Figs. III, IV, and V are drawn to smaller scale and illustrate the three component parts of the cup detached one from another. Fig. III shows in plan from above and in vertical and medial section and in side elevation as well, the cup-wall member; Fig. IV shows in plan and in side elevation the plunger member; and Fig. V shows in plan and in section and elevation the nut member.

The cup-wall member 1 will ordinarily be of cylindrical shape, as shown; it is screw-threaded externally, and so is adapted to be secured in a correspondingly screw-threaded socket borne by the part to be lubricated,— the eyed end of the connecting rod of a locomotive engine, for example. Such a complementary part is indicated at 2, Fig. II. In assembly the cup-wall member 1 when screwed to place in the part 2, is secured in suitable manner, as by localized welding, indicated at 15, Fig. II.

The plunger member 3 is of corresponding shape and size and is adapted to advance and recede axially within the cup-wall member 1. The cup-wall member and the plunger member are provided with complementary tongue and groove engaging parts, 11 and 31, whereby the advance and recession of the plunger within the cup are controlled, and, as here shown, limited to right-line movement. The plunger is prolonged as a cylindrical, exteriorly-threaded body, and is in effect a bolt, adapted for cooperation with a nut member.

The nut member 4 is screw-threaded for engagement with the bolt-like plunger member 3. The cup-wall member 1 is at its outer end provided with an annular seat 12 and the nut-member 4 is provided with a cooperating annular collar 42, which engaging one another, as shown in Fig. II, permitting relative rotation of these parts, secures them against relative movement in axial direction. The wall of the seat 12 in the cup-wall member 1 is cut away, as indicated at 13, Fig. III, to allow the nut member to be slipped by relative radial movement to and from assembly in axial alignment with cup-wall member 1, as shown in Fig. II. Between meeting faces of cup-wall member 1 and nut member 4 a yielding lock is provided, that these parts may be secured against relative movement in response to minor stresses, but may remain relatively movable under rotative stress of greater magnitude. Conveniently a spring-backed ball 44 protrudes through an orifice of less diameter in a face of the nut member, and a succession of depressions 14 are arranged at corresponding radial distance, over the opposed surface of the cup-wall member 1.

In making assembly the nut member is slipped to its seat in the cup-wall member. The plunger member is then introduced at the lower end of the cup-wall member, as seen in Fig. II and advanced upwardly, and its groove 31 brought to engagement with the tongue 11 upon the cup-wall member. Being further advanced engagement is made with the nut by rotation of the nut, and thereafter powerful turning of the nut will cause the plunger to recede and advance within the cup-wall member. The plunger having been thus withdrawn in upward direction, the space within the cup-wall member may then be filled with grease, and the assembled and filled structure may then be screwed to its place and secured in the seat 2 upon the part to be lubricated.

In operation the engineer from time to time turns the nut and causes the plunger to advance through one or more of the steps defined by the ball and recess engagement between cup and nut, and in so doing he forces fresh supplies of grease to the parts to be lubricated. When he has done this there remains still a reserve supply for use by further adjustment. The yielding connection between nut and cup is such that the jars and strains of service are ineffective to loosen the nut. It is practically secure against loss.

In service upon a locomotive engine, the lock which the spring-backed ball 44 affords by entering one or another of the recesses 14, is such as to hold the nut member secure under the strains incident to service. At the same time, this spring-backed lock will yield, when the engineer screws the nut down. The strains incident to service are not inconsiderable, by any means; but the lock described is adequate to prevent loosening and loss of parts.

In the foregoing description, service upon a locomotive engine has been in immediate contemplation. It is manifest that the grease cup is applicable to parts to be lubricated in machinery generally, and that the locking feature dwelt upon renders this structure peculiarly valuable where strains of vibration and the like are to be encountered in service.

I claim as my invention:

1. A grease-cup including a cylindrical cup-wall member, a cylindrical plunger movable longitudinally within the cup-wall member and engaging the cup-wall member in rotation-preventing engagement, the plunger being provided with an externally screw-threaded stem, and a nut making screw-threaded engagement externally upon the stem of said plunger, the nut being rotatable upon the cup-wall member and engaging the cup-wall member in an engagement preventive of relative longitudinal movement.

2. The structure of claim 1, together with means yielding to a superior force for preventing the relative turning of plunger and nut.

3. A grease cup including a cup-wall member a plunger member and a nut member, the cup-wall member being provided with a laterally opening nut seat and the nut being provided with a collar adapted to enter and to be rotatably secured in said seat, the plunger member engaging the cup-wall member in tongue and groove connection and engaging the nut member in screw-thread connection.

In testimony whereof I have hereunto set my hand.

JOSEPH J. BEDNAR.